United States Patent [19]

Saito et al.

[11] Patent Number: 4,869,104
[45] Date of Patent: Sep. 26, 1989

[54] DIFFERENTIAL PRESSURE TYPE LIQUID LEVEL METER

[75] Inventors: Hirokazu Saito; Kozo Takano; Kiyoyuki Ushirokoji; Shigeo Igarashi, all of Kanagawa, Japan

[73] Assignee: Fuji Photo Film Co., Ltd., Kanagawa, Japan

[21] Appl. No.: 329,641

[22] Filed: Mar. 28, 1989

Related U.S. Application Data

[63] Continuation of Ser. No. 83,661, Aug. 10, 1987, abandoned.

[30] Foreign Application Priority Data

Aug. 8, 1986 [JP] Japan ................. 61-185332

[51] Int. Cl.⁴ .......................................... G01F 23/16
[52] U.S. Cl. ...................................... 73/299; 73/708; 165/47
[58] Field of Search ................. 73/299, 301, 302, 303, 73/708; 165/47

[56] References Cited

U.S. PATENT DOCUMENTS

| | | | |
|---|---|---|---|
| 1,123,611 | 1/1915 | Stanley | 73/299 |
| 1,944,943 | 1/1934 | McNeill | 73/299 |
| 3,232,111 | 2/1966 | Kinderman | 73/301 |
| 3,610,042 | 10/1971 | Brosius | 73/299 |
| 3,999,435 | 12/1976 | Siegel | 73/393 |
| 4,332,166 | 6/1982 | Lawford | 73/299 |
| 4,389,888 | 6/1983 | Morooka | 73/299 |
| 4,394,346 | 7/1983 | Morooka | 73/299 |

FOREIGN PATENT DOCUMENTS

| | | | |
|---|---|---|---|
| 582210 | 12/1924 | France | 73/299 |
| 128132 | 10/1980 | Japan | 73/708 |
| 712704 | 1/1980 | U.S.S.R. | 73/708 |

*Primary Examiner*—William A. Cuchlinski, Jr.
*Assistant Examiner*—Patrick R. Scanlon
*Attorney, Agent, or Firm*—Young & Thompson

[57] ABSTRACT

A pressure difference type liquid level meter for measuring the quantity of an object liquid includes a liquid receptacle containing the object liquid, a pressure transmitting device including a pressure transmitting liquid for transmitting a pressure from the object liquid to a pressure difference detector so as to compare the transmitted pressure with a reference pressure, and an isothermal device for maintaining at least part of the pressure transmitting liquid at a predetermined temperature.

6 Claims, 5 Drawing Sheets

(a)

(b)

(a)

(b)

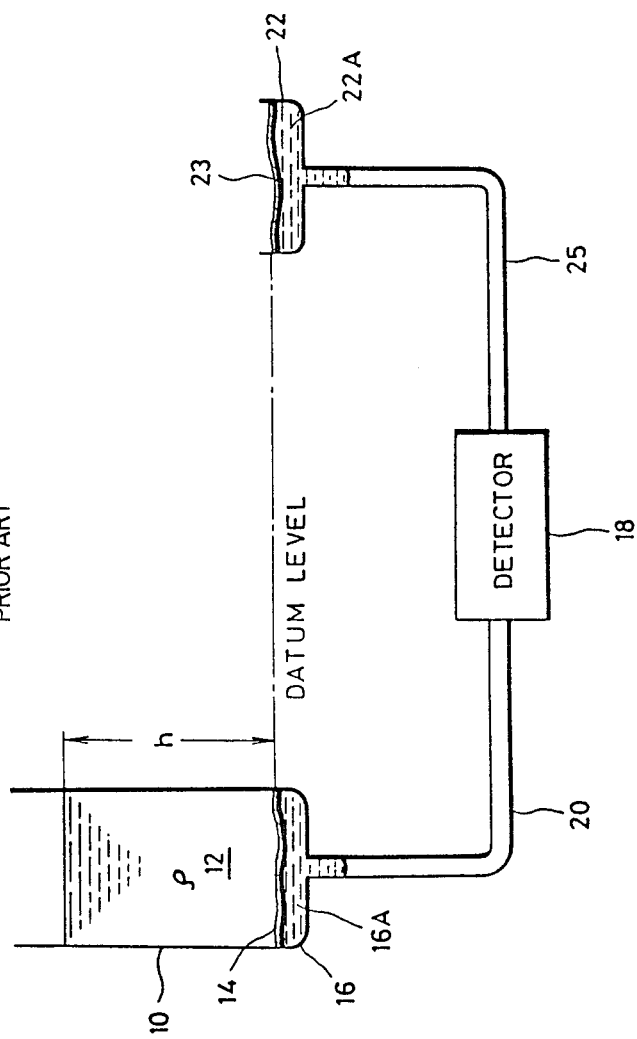

4,869,104

DIFFERENTIAL PRESSURE TYPE LIQUID LEVEL METER

This application is a continuation of application Ser. No. 083,661 filed 8/10/87 and now abandoned.

BACKGROUND OF THE INVENTION

The present invention relates to a differential pressure type liquid level meter for use with a measuring receptacle, and more particularly to a differential pressure type liquid level meter by which a highly accurate liquid level measurement can be effected for various and large quantities of liquids.

It is well known in industrial measuring to use a differential pressure gauge to measure the quantity of such liquid as industrial solutions, oils and so on contained in a receptacle by detecting the pressure difference between a pressure exerted by the subject liquid and a reference pressure, for example the atmospheric pressure.

A known differential pressure type liquid level meter shown schematically in FIG. 5 comprises a measuring receptacle 10 having a measuring pressure cell 16 at the bottom thereof, a reference pressure cell 22, and a pressure difference detector 18 communicating with the pressure cells 16 and 22 by means of conduits 20 and 25. The measuring receptacle 10 is divided by a diaphragm 14 into two chambers, namely an upper chamber for containing a subject liquid 12 and a lower chamber as the pressure cell 16. On the other hand, the reference pressure cell 22 is closed by a diaphragm 23 exposed to the air. Between each diaphragm 14, 23 and the pressure difference detector 18, there is a liquid 16A, 22A sealed in each pressure cell 16, 22 and conduits 20, 25 and filling the same. Due to such pressure cells 16, 22, the pressure exerted on each diaphragm 14, 23 is transmitted to the pressure difference detector 18 through the sealed liquid 16A, 22A. In the pressure difference detector, the pressure difference between the pressures exerted on the respective diaphragms 14 and 23 can be detected.

In such a differential pressure type liquid-level meter, assuming that $\rho$ and h are representative of the density of the subject liquid 12 and the level of the liquid 12 to be measured in the measuring receptacle 10, respectively, the total pressure P applied to the diaphragm 14 is given by the following equation:

$$P = \rho \times h + \text{atmospheric pressure} \tag{1}$$

Therefore, the level h of the liquid 12 in the receptacle 10 can be obtained by subtracting the atmospheric pressure from the resulting total pressure P actually applied to the diaphragm 14. For this subtraction, the current atmospheric pressure is detected by the detector 18 through the pressure cell 22. Based on the pressures actually applied to the diaphragms 14 and 23, the pressure deference between the two is calculated in the detector 18. The level h of the liquid 12 in the receptacle 10 is obtained by dividing the resulting pressure difference by the density $\rho$ of the liquid 12.

There are well known in the art various manners of pressure difference detection such as mechanical equilibrium methods, displacement transforming methods, etc. Widely used are electrical displacement transforming detection methods which are known as strain gauge methods, capacitance methods, inductance methods, and so on.

There is, however, a problem in the conventional pressure difference type liquid-level meters, that temperature changes of the subject liquid and/or the ambient induce temperature changes of the sealed liquid (which is generally a silicone oil) 16A, 22A, in particular, the sealing liquid 16A in the pressure cell 16 adjacent to the measuring receptacle 10, resulting in a measurement error.

Specifically, letting the pressure change of the subject liquid 12 or the atmosphere which is exerted on the sealed liquid 16A or 22A through the diaphragm 14 or 23, and the volume change of the sealed liquids 16A, 22A, be $\Delta P$ and $\Delta V$, respectively, when the temperature change of the sealed liquid 16A, 24A is infinitesimally $\Delta T$, the pressure change $\Delta P$ is represented by the following equation:

$$\Delta P = \Delta V / \phi \tag{2}$$

wherein $\phi$ is a balancing factor [mm/kg] or a natural constant corresponding to an equivalent volume change which is produced when a unit pressure is exerted on the diaphragm. The balancing factor depends on the thickness and material of the diaphragm.

The volume change $\Delta V$ of the sealed liquid 16A, 22A is represented by the following equation:

$$\Delta V = \alpha \times \Delta T \times V \tag{3}$$

wherein V is representative of the volume of the sealed liquid which is generally 3 to 15 cc and $\alpha$ is the thermal coefficient of the sealed liquid. The thermal expansion coefficient of the sealed liquid experimentally used was approximately $8 \times 10^{-4}$ per degree C.

Therefore, the change $\Delta P$ of pressure exerted on the diaphragm can be obtained from equations (2) and (3) in the following calculation:

$$\begin{aligned}
P &= \alpha \cdot \Delta T\, V/\phi \\
  &= 8 \times 10^{-4} \times \Delta T \times 4 \times 10^3/8 \times 10^6 \\
  &= 4 \times 10^{-7} \times \Delta T\, [\text{kg/mm}^2] \\
  &= 0.4 \times \Delta T\, [\text{mmH}_2\text{O}]
\end{aligned}$$

Taking for example water having a liquid column level h equal to 100mm, for the subject liquid to be measured, and assuming $\Delta T$ to be 3° C., a pressure change $\Delta P$ of 1.2 mmH$_2$0 is produced in the sealed liquid. From this calculation, it is evident that the water having the liquid level of 100 mm is measured with an error of about 1.2%. Therefore, the temperature changes of the sealed liquid lead to noticeable measurement errors of liquid level.

Although it is said that an accurate measurement can be effected by controlling the liquid to be measured and/or the ambient to have a constant temperature, it is actually hard to control the temperature of a liquid to be measured because various chemical liquids are introduced into the measuring receptacle successively for measurement.

OBJECT OF THE INVENTION

It is therefore an object of the present invention to provide a differential pressure type liquid level meter for use with a measuring receptacle in which the quantity of liquid can be measured with a high accuracy independent from the temperature of the liquid to be measured and/or of the atmosphere.

SUMMARY OF THE INVENTION

According to the present invention, the differential pressure type liquid level meter comprises a measuring receptacle for containing a liquid to be measured; a pressure cell having a liquid sealed therein for transmitting pressure exerted thereon to a pressure difference detector wherein the pressure is compared with a reference pressure to obtain a pressure difference; and isothermal means for maintaining the sealed liquid at a predetermined temperature.

The isothermal means may take any of various forms well known to those skilled in the art, for example a source of warm water, an electric heater, a source of warm air or warm oil, and so on.

According to a feature of the present invention, because the temperature of the sealed liquid does not change much with the temperature of the liquid to be measured, the accuracy of the measurement is considerably improved.

BRIEF DESCRIPTION OF THE DRAWINGS

FIG. 5, as indicated above, is a schematic illustration of a known differential pressure type liquid level meter.

DETAILED DESCRIPTION OF THE INVENTION

Figure 1:
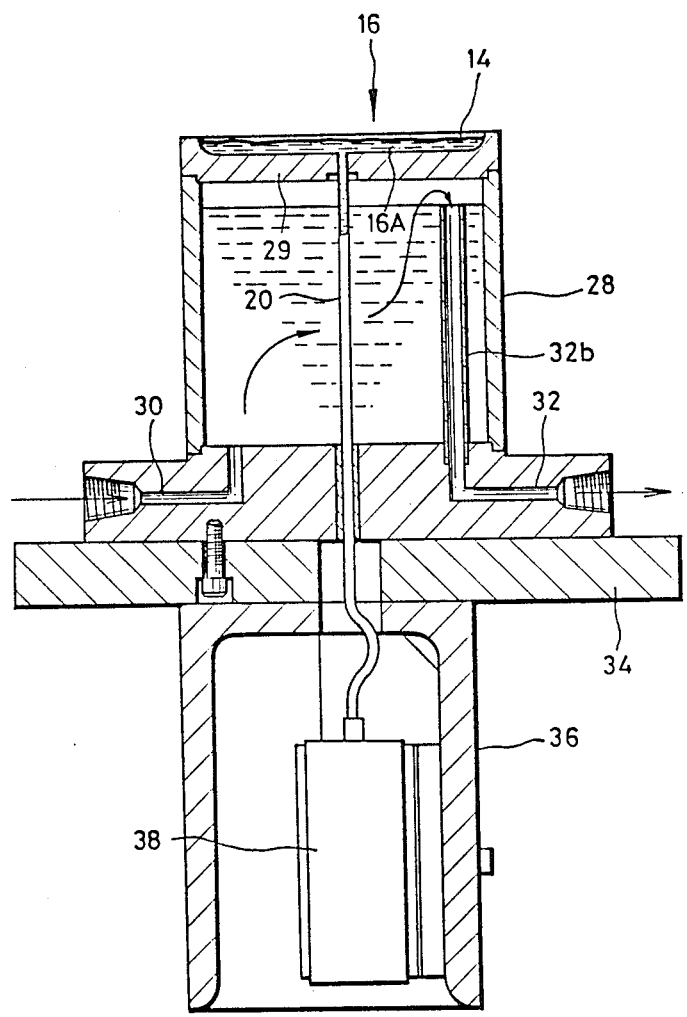
FIG. 1 is a cross sectional view of a differential pressure type liquid level meter of a preferred embodiment according to the present invention.
Figure 2:
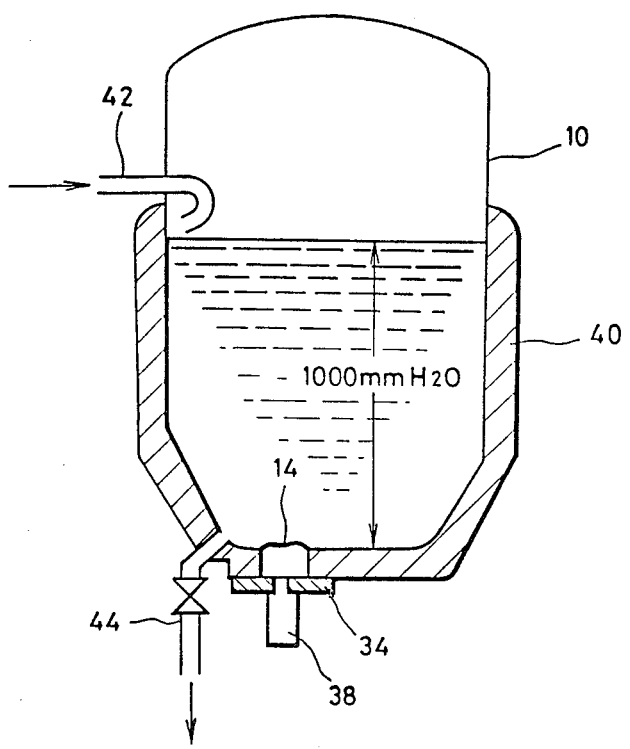
FIG. 2 is a cross sectional view of a measurement receptacle for use with the differential pressure type liquid level meter of FIG. 1.

Referring to FIG. 1 showing a preferred embodiment of the pressure difference type liquid level meter according to the present invention, a flange 34 is adapted to be attached to the measuring receptacle 10 shown in FIG. 2, within which a vessel 28 is fixed. At the top of the vessel 28 there is provided a pressure cell chamber 16 defined between a partition wall 29 and a diaphragm 14 having a thickness of approximately 0.08 mm wherein a liquid 16A is sealed. The pressure cell chamber 16 communicates with a pressure difference detector 38 through a communication tube 20 passing inside the vessel 28 and piercing the flange 34. It should be noted that the chamber 16 and the conduit 20 are completely filled with the sealed liquid 16A so as to form a pressure cell for detecting pressure exerted on the diaphragm 14 by a subject liquid. Warm water is continuously supplied into and discharged from the vessel 28 through an inlet 30 and an outlet 32 provided at the bottom of the vessel 28. The outlet 32 communicates with a discharge pipe 32b disposed inside the vessel 28 and extending close to the partition wall 29 so as to circulate effectively the warm water in the vessel 28. Therefore, the vessel 28 functions as an isothermal chamber.

As is shown in FIG. 2, the pressure difference type liquid level meter is supported by the flange 34 from the liquid receptacle 10 partly enclosed by a jacket 40. A liquid to be measured is introduced into the receptacle 10 through an inlet 42 and discharged through an outlet 44. Under the flange 34 there is a pressure sensor 38 fixedly supported by a supporting member 36 (FIG. 1). In this embodiment, a diffusion type diode strain gauge is used for the pressure sensor 38. This strain gauge functions to convert pressure exerted on the sealed liquid 16A through the diaphragm 14 into a change of resistance value. On the other hand, in the same manner as is shown in FIG. 5, the atmsopheric pressure exerted on the sealed liquid 22a through the diaphragm 23 is detected as a reference resistance value. Therefore, based on the difference between the resistance value from the pressure sensor 38 and the reference resistance value, the quantity of the liquid in the measuring receptacle 10 can be calculated. The pressure sensor 38 used in this embodiment provides an output of 4 to 20 mA according to liquid levels between 0 and 1,000 mmH₂0.

Figure 3:
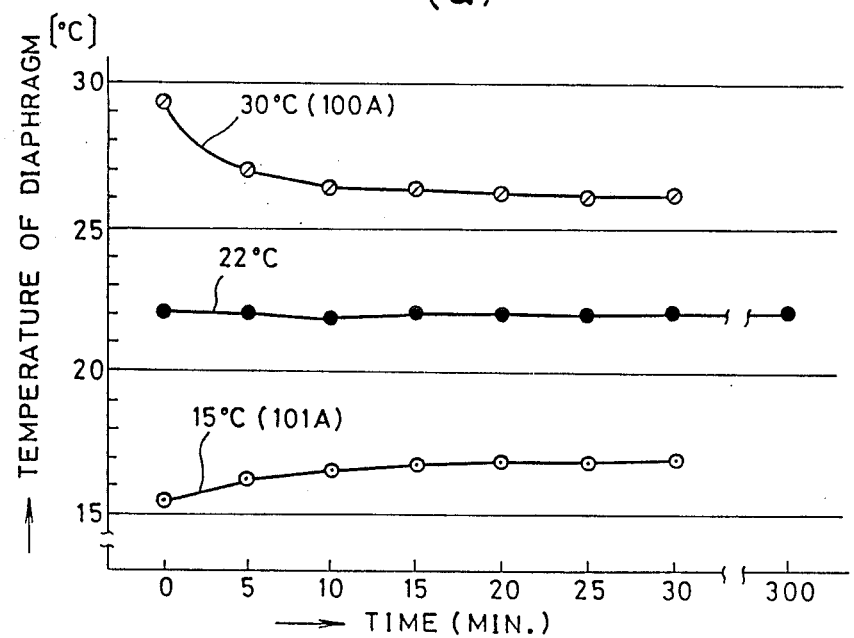
FIGS. 3(a) and 3(b) are graphs showing the experimental results of measurements made with conventional differential type liquid level meters.
Figure 3:
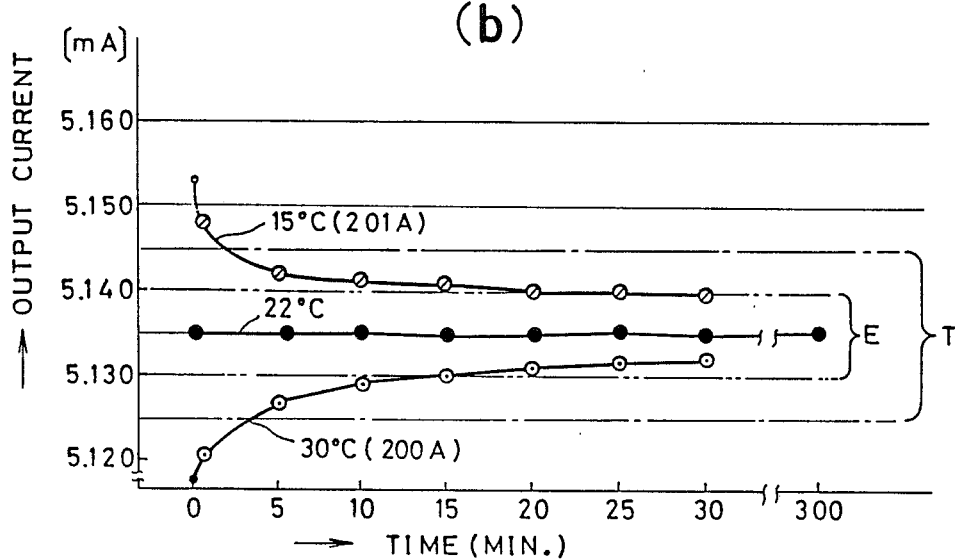
Figure 4:
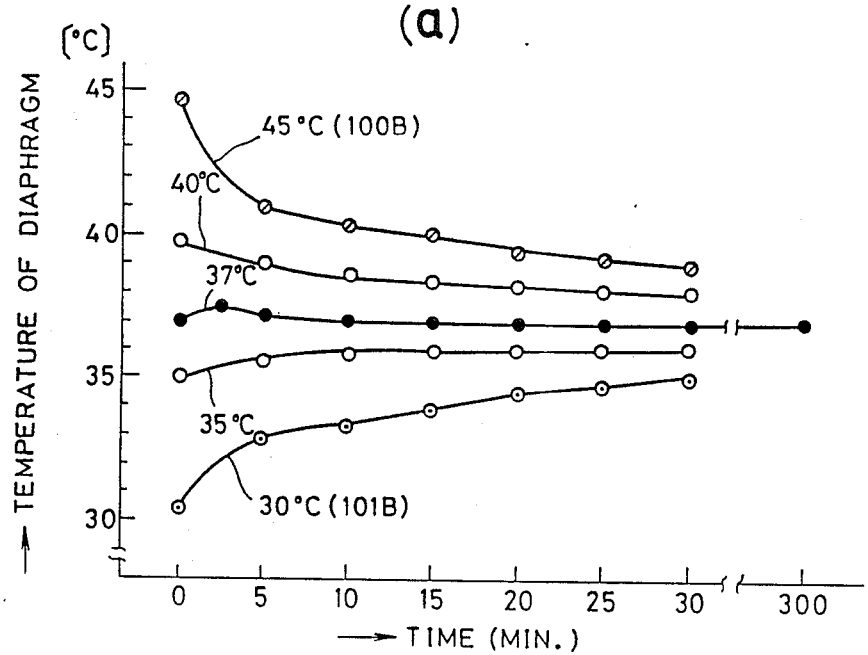
FIGS. 4(a) and 4(b) are graphs similar to the graphs of FIGS. 3(a) and 3(b) showing the experimental results of measurements made with the differential type liquid level meter of the present invention.
Figure 4:
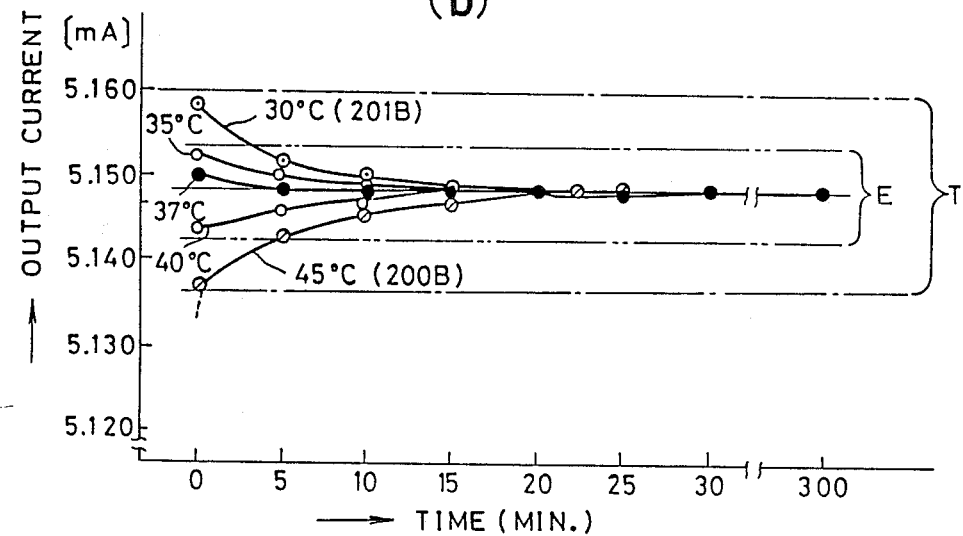

Reference is now had to FIGS. 3 and 4 showing several graphs displaying the experimental results of liquid level measurement wherein the X-axis represents time and the Y-axis represents temperature of the diaphragms 14, 23 or output current from the pressure detector 38 which is equivalently representative of the pressure exerted on the diaphragm. The graphs of FIGS. 3(a) and 3(b) show the results of the measurements made for the subject liquid at a temperature of 15° C., 22° C. and 30° C., respectively, when the sealed liquid is maintained at 22° C. (i.e. room temperature), by a conventional liquid level meter as in FIG. 5.

The graphs of FIGS. 4(a) and 4(b) show the results of the measurements made for the subject liquid at temperatures of 30° C., 35° C., 37° C., 40° C. and 45° C, respectively, when the sealed liquid is maintained at 37° C. by the liquid level meter according to the present invention. What is evident on comparing the experimental results obtained by the conventional liquid level meter and the level meter of the present invention, in particular on comparing the measured curves 100A and 101A (which represent the temperature change of the diaphragm 14 when the subject liquid has a temperature difference of +8° C. relative to the temperature of the sealed liquid 16A), and 100B and 101B (which represent the temperature change of the diaphragm 14 when the subject liquid introduced has a temperature difference of −7° C. relative to the temperature of the sealed liquid 16A), respectively, is that there is no substantial difference in temperature change between the corresponding two curves.

However, as to the output current from the pressure detector 38, there is a noticeable difference between the measured curves 200A, 201A by the conventional level meter and the measured curves 200B and 201B by the level meter according to the present invention as is shown in the following table:

| Object Liquid Temperature | Output Current Difference | |
|---|---|---|
| | Present Invention | Conventional |
| +8° C. | 0.008 mA | 0.013 mA |
| −7° C. | 0.009 mA | 0.015 mA |
| Normal (0° C.) | 0 mA | 0 mA |

As is to be understood from the above table, the range over which the output currents converge with time is much narrower in the case of the level meter of the present invention than in the case of a conventional level meter.

It is evident that the conventional level meter has a measurement error of approximately 63% greater when the subject liquid has a temperature difference of +8° C. relative to the temperature of the sealed liquid or approximately 67% greater when the subject liquid has a temperature difference of −7° C. relative to the temperature of sealed liquid, as compared to the level meter of the present invention. In other words, because the pressure detector 38 can output current from 4 mA to 20 mA corresponding to a liquid pressure between 0 and 1,000 mmH$_2$0, the measurable minimum pressure of the subject liquid while maintaining a measurement error less than 1%, is about 187.5 mmH$_2$0 for the conventional level meter but about 104.2 mmH$_2$0 for the level meter of the present invention.

In each of FIGS. 3(b) and 4(b), the characters E and T indicate ranges wherein 10 liters of water and 20 liters of water can be measured, each with a measurement error less than 1%. It will be apparent from such a comparison of the curves that the time required to obtain measurement accuracy better than 1% is much shorter with the level meter of the present invention than with a conventional level meter.

It should be noted that, although warm water is circulated in the vessel in the above-described embodiment, not only may the warm water be replaced with warm air, warm oil or the like but also an electric heater may be used to directly heat the sealed liquid.

Although the present invention has been fully described by way of the preferred embodiment thereof with reference to the accompanying drawings, it is to be noted that various changes and modifications will be apparent to those skilled in the art. Therefore, unless otherwise such changes and modifications depart from the true scope of the present invention, they should be construed as included therein

What is claimed is:

1. A differential pressure type liquid level meter for measuring a quantity of liquid based on a pressure difference between a liquid pressure and a reference pressure, comprising
    a measuring receptacle for containing a liquid whose quantity is to be measured;
    a pressure difference detector;
    pressure transmitting means comprising a diaphragm and a liquid sealed between said diaphragm and said pressure difference detector for transmitting pressure from said liquid in said receptacle to said pressure difference detector;
    means for producing a reference pressure and transmitting it to said pressure difference detector; and
    isothermal means for maintaining said sealed liquid at a predetermined temperature, said isothermal means including a chamber enclosing at least part of said sealed liquid therein and means for circulating in said chamber a heating liquid maintained at said predetermined temperature, said chamber having a bottom member closing the chamber, said circulating means comprising an inlet for said heating liquid and an outlet for said heating liquid both passing through said bottom member, said inlet and outlet opening into said chamber on opposite sides of said chamber, and an upright discharge pipe connected at its lower end to said bottom member and communicating with said heating liquid outlet, said pipe terminating at its upper end below the upper end of the chamber to serve as an overflow pipe through which said heating liquid which has entered said chamber through said heating liquid inlet flows after passing upwardly through said chamber and from side to side across said chamber.

2. A pressure difference type liquid level meter as defined in claim 1, wherein said reference pressure is atmospheric pressure.

3. Pressure difference type liquid level meter as defined in claim 1, wherein said heating liquid is warm water.

4. A pressure difference type liquid level meter as defined in claim 1 wherein said heating liquid is warm oil.

5. A differential pressure type liquid level meter for measuring a quantity of liquid based on a pressure difference between the pressure of the liquid whose quantity is to be measured and a reference pressure, said liquid level meter comprising:
    a measuring receptacle for containing a subject liquid whose quantity is to be measured;
    pressure transmitting means including a pressure transmitting liquid for transmitting said pressure from said subject liquid in said receptacle to a pressure difference detector to compare said transmitted pressure with said reference pressure in order to obtain the pressure difference; and
    isothermal means for maintaining said transmitting liquid at a predetermined temperature, said isothermal means including a chamber enclosing at least part of said pressure transmitting liquid therein and means for circulating in said chamber a heating liquid maintained at said predetermined temperature, said chamber having a bottom member closing the chamber, said circulating means comprising an inlet for said heating liquid and an outlet for said heating liquid both passing through said bottom member, said inlet and outlet opening into said chamber on opposite sides of said chamber, and an upright discharge pipe connected at its lower end to said bottom member and communicating with said heating liquid outlet, said pipe terminating at its upper end below the upper end of the chamber to serve as an overflow pipe through which said heating liquid which has entered said chamber through said heating liquid inlet flows after passing upwardly through said chamber and from side to side across said chamber.

6. A pressure difference type liquid level meter as defined in claim 5, wherein said pressure transmitting means includes a diaphragm on which said pressure from said subject liquid is directly exerted, said pressure transmitting liquid being sealed between said diaphragm and said pressure difference detector.

* * * * *